Dec. 23, 1958    C. N. LENGYEL    2,865,108
COMPOUND MEASURING INSTRUMENT
Filed Jan. 10, 1956
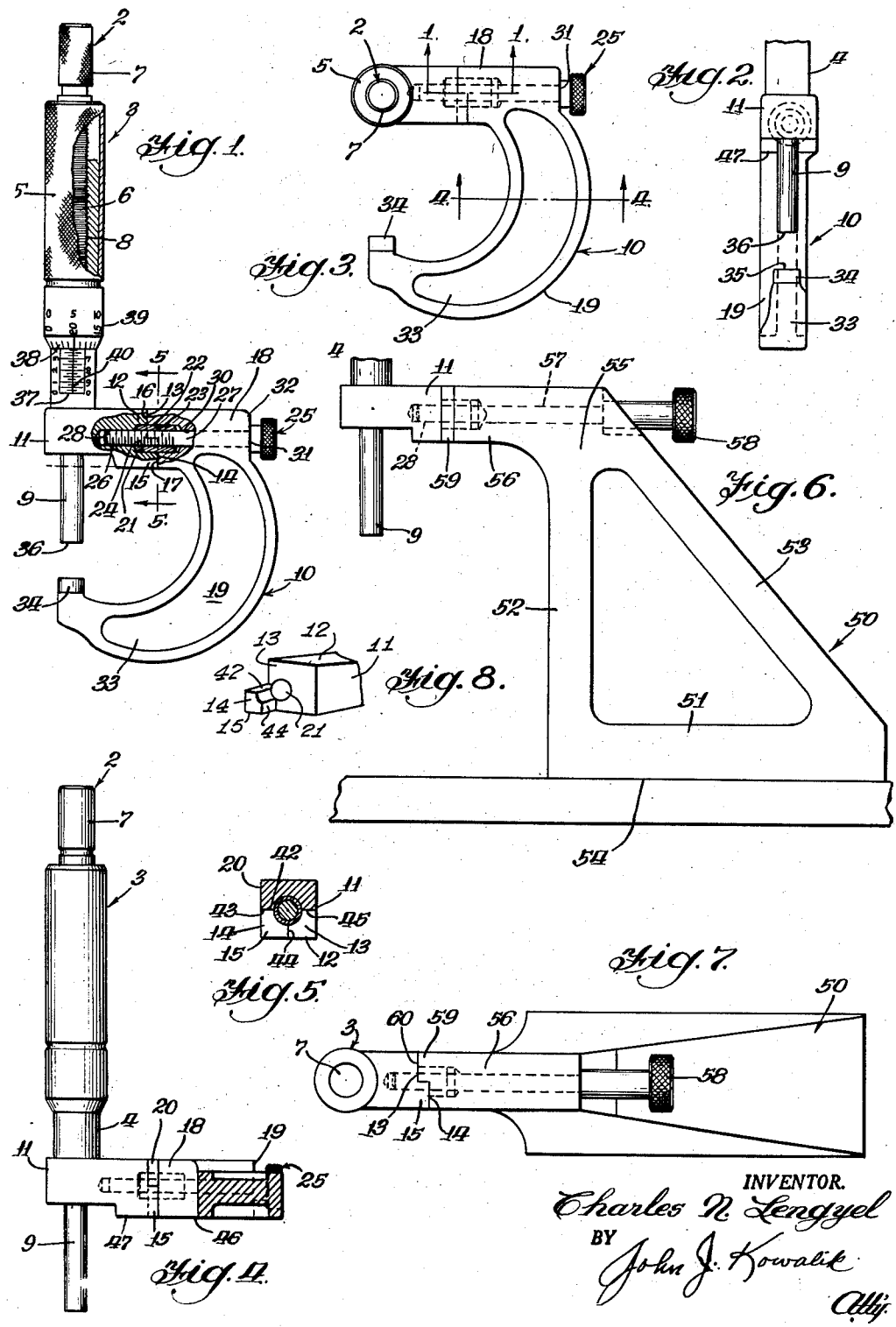
INVENTOR.
Charles N. Lengyel
BY
John J. Kowalik
Atty.

United States Patent Office 2,865,108
Patented Dec. 23, 1958

2,865,108

COMPOUND MEASURING INSTRUMENT

Charles N. Lengyel, Chicago, Ill.

Application January 10, 1956, Serial No. 558,256

6 Claims. (Cl. 33—167)

This invention relates to precision measuring instruments and more specifically to a novel plural linear measuring device.

A general object of the invention is to provide a simple, economical and practical measuring device which incorporates a plurality of parts adjustable to different relative positions to obtain several entirely different measuring instruments which closely approximate individual corresponding instruments currently used in the trades.

A primary object is to devise a combination external caliper micrometer and depth gauge.

A further object is to provide a unit which comprises a micrometer head and an indexing element associated therewith either in the form of a frame member or a height block which is positionable in a plurality of positions to provide different measuring devices so arranged that the micrometer head serves as a common measuring unit.

More specifically the invention contemplates the provision of a micrometer head to which a frame element is removably attachable and swingable about an axis at right angles to the spindle of the micrometer head, the frame element having an anvil at its outer end alignable with the spindle axially thereof whereby the device forms an external micrometer caliper and the frame member having a lateral side which provides an indexing surface disposable at right angles to the spindle by swinging the frame member about said axis whereupon the device converts into a depth gauge.

A still further object is to provide a novel micrometer head with calibrations on a common scale for the different elements corresponding to the conventional devices.

These and other objects of the invention will become more apparent from the following specifications and drawings, wherein:

Figure 1 is a side elevational view of the instrument illustrated as a micrometer caliper with parts broken away and shown in section a portion of which is taken substantially on the line 1—1 of Figure 3;

Figure 2 is a fragmentary edge view of the structure shown in Figure 1;

Figure 3 is a plan view of the device arranged as a depth gauge;

Figure 4 is a sectional view substantially on line 4—4 of Figure 3;

Figure 5 is a transverse sectional view taken substantially on the line 5—5 of Figure 1;

Figures 6 and 7 show a height gauge attachment, Figure 6 being a side elevational view with the micrometer head fragmentarily shown, and Figure 7 being a top view of the structure shown in Figure 6; and Figure 8 is a fragmentary perspective view of the interlocking surfaces on the parts.

Describing the invention in detail, the measuring instrument generally indicated 2 comprises a basic portion or micrometer head 3 which includes a barrel 4 about which is sleeved a thimble 5 connected to the micrometer screw 6 preferably through a ratchet clutch 7, as well known in the art. The screw 6 is threaded into the barrel threads 8 and connected to a spindle 9 which projects from the barrel into a frame generally indicated 10.

The frame has a fixed base portion or stub extension 11 preferably integrally connected to the adjacent end of the barrel and projecting transversely outwardly therefrom.

The transaxial member 11 at its outer extremity or distal end 12 is provided with stepped parallel planar faces 13 and 14 which are parallel to the axis of the spindle, face 14 being provided on a shoulder 15 which projects outwardly of the base end 12.

The faces 13 and 14 are engaged by complementary faces 16 and 17 on the inner end 18 of a jaw portion 19 of the frame 10. The face 16 is formed on a shoulder 20 on the inner end of the jaw element and face 17 on the body portion of the inner end of the jaw member.

The ends 12 and 18 are formed with coaxial bores 21 and 22 (Figure 1) into which fits a precision pin 23 in the form of a bushing with a center opening 24 through which extends a securing and adjusting bolt member 25 which has a threaded end 26 on a shank 27. The threaded end 26 threads into a threaded bore 28 which is coaxial with bore 21 and extends inwardly thereof. The shank extends through the center opening 24 in the bushing and through a coaxial bore 30 which communicates with bore 22. The outer end of bolt 25 is provided with a knurled head which engages against an external abutment surface 31 at the outer extremity 32 of the inner end portion 18 of the jaw.

The jaw member is of arcuate form and has an outer end portion 33 which is provided with an anvil 34 in axial alignment with the spindle and provided with a measuring face 35 which is adapted to cooperate with a measuring face 36 on the adjacent outer end of the spindle.

Referring now to Figure 1 it will be noted that the barrel is provided with graduations on one or left side of a scale indicated 37 which commence with 0 and continue 1, 2, 3 etc. and are read against the edge 38 of the thimble. The thimble has a vernier scale 39 with indicia 0, 5, 10 etc. along its bottom edge which reads against an index line 40 on the barrel. The scale 37 has a depth indicia 0, 9, 8 etc. on the opposite or right side of said scale 37 and the vernier or upper scale is indicated 0, 5, 10 etc. in the opposite direction to the micrometer external caliper vernier scale.

The instrument when used as an external caliper micrometer has its jaw portion swung to the position shown in Figures 1 and 2 about the pivot with the end faces 42, 43 (Figure 5) on the shoulders 15 and 20 abutting and the instrument is used as a conventional micrometer. The jaw portion has a second position whereat it is swung upwardly from its first position with the faces 44 and 45 on the shoulders 15 and 20 engaged. In the second position the jaw portion has its bottom indexing edge 46 positioned normal to the axis of the spindle and is formed to extend coplanar with the bottom edge 47 of the base portion of the unit. These edges 46 and 47 are adapted to be laid upon the surface from which the depth is to be measured and the depth gauge scale on the right side of the barrel (Figure 1) and the upper vernier depth gauge scale (Figure 1) are used for taking readings.

Thus it will be seen that a simple and inexpensive dual measuring device is provided which has a minimum of parts and the parts are so arranged that they may be easily manufactured and precision made. The device is easy to use and is of practical form.

Referring now to Figures 6 and 7, there is shown a height gauge attachment 50 for the basic structure. The attachment comprises a triangular element which includes a base member 51, an upright side member 52 and a hypotenusal element 53. The base member has an indexing or reference surface 54 adapted to be seated upon a gauge surface. The element 50 at its upper apex 55 is provided with a lateral extension 56 which has an aperture 57 receiving a bolt 58 which threads into the aperture 28 of the basic part or micrometer head. The extension 56 has a shoulder 59 which cooperates with the shoulder 15 and engages at its end 60 with faces 13 and 14.

The element 50 is preferably used in the positions shown in Figures 6 and 7. However it will be obvious that the member 50 may be disposed at various degrees of inclination to the axis of the spindle to measure along inclined surfaces and with the use of trigonometric functions provide linear measurements between the spindle and the reference face 54.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. The combination of a micrometer head including an axially movable spindle having a measuring face, a transaxial stub member connected to said head, and an indexing member pivoted to the distal end of said stub member on an axis extending substantially perpendicular to said spindle, a plurality of reference surfaces on at least one of said members angularly related to each other about said axis and adapted to cooperate with said spindle face, said indexing member swingable about said axis to positions disposing said surfaces in cooperative relation with said spindle face parallel or non-parallel thereto.

2. The combination of a micrometer head having a barrel and a micrometer screw threaded therein and a spindle connected to the screw and projecting from one end thereof and a thimble connected to the screw and telescoped over said barrel, a scale on said barrel having transversely scribed graduations and an indicia arranged in an ascending progression from said one end of said barrel toward the other on one side thereof and in a descending arithmetic progression on the other side thereof, a pair of vernier scales on said thimble with axially scribed graduations, an indexing line on the barrel cooperative with said graduations on the thimble providing a reading therefor, and a frame member movably connected to said micrometer head and having an anvil alignable axially of said spindle in one position of said frame whereby providing an external caliper micrometer, and said frame movable to a second position with its major plane substantially perpendicular to said spindle, and a reference surface on a side of said frame adapted in said second position thereof to cooperate with said spindle and defining a depth gauge with said head.

3. The combination of a micrometer head including a barrel, and a spindle projecting from one end thereof, a stub member fixed to said barrel at one end, an arcuate frame member having an end portion abutting the distal end of said stub member, means extending through said end portion and into said distal end and pivotally interconnecting said members on an axis extending substantially at right angles to the longitudinal axis of said spindle, said frame member having a free end, an anvil carried thereon, said frame member swingable about said axis of said means and having a first position axially aligning said anvil with said spindle and forming an external caliper micrometer and said frame swingable to a second position at right angles to the first and having a side reference surface disposed in said second position of the frame member at right angles to said spindle and forming a depth gauge with said head.

4. A measuring instrument comprising a mircometer head having a barrel with an axially extending scale thereon, a thimble sleeved over the barrel and a micrometer screw threaded into the barrel and having a spindle at one end projecting from one end of the barrel and an operative connection between the other end of the screw and the thimble, means on the thimble cooperative with said scale to afford readings, a frame connected to the barrel and including a plurality of movably interconnected parts having a first position disposing said frame with its major plane generally parallel to said spindle and having a second position substantially normal to the first, and said frame having two separate reference surfaces and said spindle having a measuring face, and one of said surfaces disposed in axial alignment with said face in said first position, and the other surface disposed parallel to said face in the said second position of said frame.

5. A combined external caliper micrometer and depth gauge comprising a micrometer head including a barrel and a spindle projecting from one end thereof and having an outer end measuring face, a frame connected to said barrel and comprising a first part extending laterally from said head and connected at one end to said end of the barrel, a second part having a first end portion abutting the distal end of said first part and projecting outwardly in extension thereof, a pivot bushing telescoped within coaxial bores in said end portion and said distal end and providing an axis of pivot between said parts transversely of said spindle, a bolt having a shank extending through coaxial apertures in said end portion, bushing, and threaded into said distal end and having a head in abutment with said end portion at its extremity remote from said distal end for locking said parts in selected adjusted position attendant to threading the bolt into said distal end, said second part being curved from said end portion thereof in a direction toward said spindle, said second part having an outer end, an anvil on said outer end, said second part swingable about said axis to a position disposing said outer end and anvil in axial alignment with said spindle whereby forming an external caliper micrometer, a reference surface on one of said parts extending normal to the axis of said spindle, said second part swingable to a position exposing said surface for seating against a surface from which a depth is to be measured, said reference surface disposed to extend coplanar with said face in the zeroed position of said spindle.

6. For a combination measuring instrument, a micrometer head having a barrel, a micrometer screw threaded therein, a thimble sleeved over the barrel and operatively connected to said screw, a scale on the barrel having opposite edges reversely numbered, said thimble having an edge cooperative with said scale for indicating readings thereon and having a pair of axially spaced reversely numbered vernier scales, an index line on the barrel cooperative with said vernier scales, a spindle connected to said screw and projecting outwardly of one end of the barrel and having an outer measuring face, a mounting portion connected to said one end of the barrel and projecting outwardly therefrom substantially normal thereto and having a distal end, and means on said distal end for connection to an associated element providing a reference surface for said spindle, and said element and distal end having cooperative surfaces spaced circumferentially about said axis of pivot and abuttable with each other for limiting swinging movement of said element about said axis.

References Cited in the file of this patent

UNITED STATES PATENTS

| 939,562 | Spahn | Nov. 9, 1909 |
| 1,318,726 | Ciha | Oct. 14, 1919 |
| 2,520,022 | Vobeda | Aug. 22, 1950 |

FOREIGN PATENTS

| 143,615 | Great Britain | May 25, 1920 |